US012752672B2

(12) United States Patent
Hong et al.

(10) Patent No.: US 12,752,672 B2
(45) Date of Patent: Oct. 6, 2026

(54) FREE HINGE DRIVE SYSTEM FOR LINK OF VEHICLE SEAT

(71) Applicants: Hyundai Motor Company, Seoul (KR); Kia Corporation, Seoul (KR); DAS CO., LTD, Gyeongsangbuk-do (KR)

(72) Inventors: Deok-Gi Hong, Busan (KR); Keun Gwack, Ulsan (KR); Jae-Youn Kim, Ulsan (KR)

(73) Assignees: Hyundai Motor Company, Seoul (KR); Kia Corporation, Seoul (KR); DAS CO., LTD, Gyeongju (KR)

( * ) Notice: Subject to any disclaimer, the term of this patent is extended or adjusted under 35 U.S.C. 154(b) by 301 days.

(21) Appl. No.: 18/380,831

(22) Filed: Oct. 17, 2023

(65) Prior Publication Data

US 2024/0278693 A1 Aug. 22, 2024

(30) Foreign Application Priority Data

Feb. 22, 2023 (KR) ........................ 10-2023-0023262

(51) Int. Cl.
*B60N 2/08* (2006.01)

(52) U.S. Cl.
CPC .................................. *B60N 2/0887* (2013.01)

(58) Field of Classification Search
CPC .... B60N 2/0887; B60N 2/1889; B60N 2/168; B60N 2/938; B60N 2/165; B60N 2/1864; B60N 2/16; B60N 2/1605; B60N 2/161; B60N 2/1615; B60N 2/162; B60N 2/1625; B60N 2/163; B60N 2/1635; B60N 2/164; B60N 2/1645; B60N 2/1655; B60N 2/166;
(Continued)

(56) References Cited

U.S. PATENT DOCUMENTS 4,903,931 A * 2/1990 Shimazaki ........... B60N 2/1695
248/421
8,684,462 B2 * 4/2014 Brewer .................... B60N 2/06
297/344.17
10,661,685 B2 * 5/2020 Kim ........................ F16D 41/06
(Continued)

FOREIGN PATENT DOCUMENTS

DE 102020106821 A1 * 9/2021 ........... B60N 2/1615
JP 2021100852 A * 7/2021
(Continued)

*Primary Examiner* — David R Dunn
*Assistant Examiner* — Jessica Kathryn Thompson
(74) *Attorney, Agent, or Firm* — Fox Rothschild LLP

(57) ABSTRACT

A free hinge drive system for a link of a vehicle seat such as a relaxation seat includes a first pinion gear of a motor and a second pinion gear of a brake device that are connected by an interconnection member, and a first sector gear gear-coupled to a first pinion gear and a second sector gear gear-coupled to a second pinion gear have symmetric shapes. In operation, a free hinge of the link is rotated by release of a braking force of the brake device during a relaxation operation, and the free hinge of the link is restrained by a braking force when the relaxation operation is not performed, thereby preventing lift of a second front height link corresponding to another side output (outer side) in the event of a rear collision, improving passenger safety, and minimizing forward and rearward movements of the vehicle seat.

19 Claims, 11 Drawing Sheets

(58) Field of Classification Search
CPC .... B60N 2/1665; B60N 2/167; B60N 2/1675; B60N 2/1685; B60N 2/169; B60N 2/1695
See application file for complete search history.

(56) References Cited

U.S. PATENT DOCUMENTS

| | | | | |
|---|---|---|---|---|
| 10,766,383 | B2 * | 9/2020 | Mike | B60N 2/168 |
| 2001/0022460 | A1 * | 9/2001 | Kondo | B60N 2/62 297/284.11 |
| 2012/0074743 | A1 * | 3/2012 | Asakura | B60N 2/4228 297/216.1 |
| 2019/0152352 | A1 * | 5/2019 | Handigol | B60N 2/12 |
| 2023/0322130 | A1 * | 10/2023 | Kumamoto | B60N 2/682 297/344.15 |

FOREIGN PATENT DOCUMENTS

| | | | | |
|---|---|---|---|---|
| KR | 20180004455 | A * | 1/2018 | B60N 2/1635 |
| KR | 10-2153216 | B1 | 9/2020 | |
| KR | 102235731 | B1 * | 4/2021 | B60N 2/165 |

* cited by examiner

FREE HINGE DRIVE SYSTEM FOR LINK OF VEHICLE SEAT

CROSS-REFERENCE TO RELATED APPLICATION

This application claims under 35 U.S.C. § 119(a) the benefit of Korean Patent Application No. 10-2023-0023262, filed on Feb. 22, 2023, the entire contents of which are incorporated herein by reference.

BACKGROUND

(a) Technical Field

The present disclosure relates to a free hinge drive system for a link of a vehicle seat, more particularly, to the free hinge drive system for the link, which is rotatable by release of a braking force of a brake device during a relaxation operation or restrained by the braking force when the relaxation operation is not performed.

(b) Description of the Related Art

In general, a seat for a vehicle includes a seat cushion on which a passenger is seated, a seatback connected to the seat cushion and configured to support the passenger's back, and a headrest provided at an upper end portion of the seatback and configured to support the passenger's neck and head. A seat adjustment device and various convenience devices are installed inside and outside the seat.

For example, to improve ride quality and convenience for the passenger, a vehicle seat (also referred to herein as a "relaxation seat") is applied, which implements an operation (hereinafter, referred to as a 'relaxation operation' or 'relaxation') of changing a seating posture of the passenger by adjusting angles of the seatback and the seat cushion through buttons manipulated by the passenger.

Typically, a seat (e.g., a relaxation seat 1) in the related art adopts a five-joint link structure. As illustrated in FIG. 2 (RELATED ART) which is an enlarged view of part "A" of a seat cushion in FIG. 1 (RELATED ART), a relaxation motor 30 is installed at one end portion of an inner side (drive part) of a regulation pipe 10 by a first sector gear 20. A first front height link 40 is installed at the other end portion of the regulation pipe 10 by the first sector gear 20, and a second front height link 42 is installed at one end portion of an outer side (output part) of the regulation pipe 10 by a second sector gear 22.

As described above, when the relaxation motor 30 at the inner side of the relaxation seat 1 operates, a pinion gear (not shown) of the relaxation motor 30 rotates the first sector gear 20, and the first sector gear 20 rotates the regulation pipe 10 and simultaneously rotates the second sector gear 22 connected to the outer side of the regulation pipe 10.

In this case, the first sector gear 20 at the inner side and the second sector gear 22 at the outer side simultaneously rotates the first front height link 40 connected to one end portion of the first sector gear 20 and the second front height link 42 connected to one end portion of the second sector gear 22, while both rotating.

However, the inner side in the related art is restrained by the relaxation motor 30, but the outer side is not restrained since a link free hinge part B including the second sector gear 22 and the second front height link 42 is installed. For this reason, in the event of a rear collision, an elastic deformation angle of the seatback decreases, and safety of a passenger in a rear seat deteriorates. Further, in the event of a rear collision, the second front height link 42 at the outer side is lifted, which causes a concern of deterioration in passenger safety. Because there is no device for restraining or regulating the link free hinge part B, the link free hinge part B is highly vulnerable to forward and rearward movements of the seat.

In addition, in the related art, a middle portion of the regulation pipe 10 is formed of a bent shape with high rigidity and is structured to be connected to and restrained by the inner side to prevent the lift of the second front height link 42 and suppress interference between components in the event of a rear collision. For this reason, a difference in rear collision strength greatly varies depending on strength and dimension of the regulation pipe 10, leftward and rightward warping and forward and rearward movements of the regulation pipe 10 vary depending on mounting positions of the regulation pipe 10, and a seat internal space is narrowed by the bent portion, which causes deterioration in mass-production or assembling efficiency.

In addition, in the related art, to solve the problem that occurs because there is no device for restraining or regulating the link free hinge part B, a process of applying the relaxation motors 30 and 32 to two opposite ends (the inner side and the outer side) of the regulation pipe 10 needs to be added to some types of vehicles, as illustrated in FIG. 3 (RELATED ART).

Summary

Accordingly, an object of the present disclosure is to provide a free hinge drive system for a link of a vehicle seat, in which the link has a free hinge, which is rotated by release of a braking force during a relaxation operation or restrained by the braking force when the relaxation operation is not performed, the free hinge drive system being configured to ensure safety of a passenger in a rear seat by preventing lift of a front height link in the event of a rear collision, ensure quality by regulating forward and rearward movements of the front height link corresponding to an output part (outer side), and improve mass-production and assembling efficiency by ensuring a wide seat internal space by a high-rigidity straight pipe.

To achieve the above-mentioned object, an embodiment of the present disclosure provides a free hinge drive system for a link, the free hinge drive system may include: one side drive part (inner side) in which a motor is mounted at one side of a vehicle seat (e.g., a relaxation seat); and the other output part (outer side) in which a brake device is mounted at the other side of the relaxation seat to stop rotating by a braking force thereof under a brake condition and to rotate in the same direction simultaneously by receiving a rotational force of the motor by an interconnection member to eliminate a braking force under a brake release condition.

In the embodiment, one side drive part (inner side) may include: the motor mounted on the relaxation seat by a first fixing member; a first sector gear having a central side rotatably connected to one side of the first fixing member, and a rear side gear-coupled to a first pinion gear of the motor; and a first front height link rotatably connected to a front side of the first sector gear.

In the embodiment, one side portion of the motor may be mounted on a motor mounting member installed at one side of the relaxation seat so that the first pinion gear penetrates through one end portion of the interconnection member.

In the embodiment, a connection socket may penetrate through a center of the motor mounting member, one end portion of the connection socket may be fitted with and connected to the first pinion gear while corresponding to a gear shape, and the other end portion of the connection socket may be fitted with and connected to an inner diameter of one end portion of the interconnection member.

In the embodiment, the other output part (outer side) may include: the brake device mounted on the relaxation seat by a second fixing member; a second sector gear having a central side rotatably connected to one side of the second fixing member and a rear side gear-coupled to a second pinion gear of the brake device; and a second front height link rotatably connected to a front side of the second sector gear.

In the embodiment, the brake device may include: a coupling connected to the interconnection member; an unlocking block connected to be accommodated in the coupling; and a brake part (brake) configured to perform control to stop a rotation of the unlocking block under the brake condition and to rotate the unlocking block and the second pinion gear under the brake release condition.

In the embodiment, the second pinion gear, the coupling, the unlocking block, and the brake part may be rotatably supported between a housing and a cover coupled to correspond to each other.

In the embodiment, the coupling may include: a fourth through-hole formed at a center of the coupling; a gear shaft of the second pinion gear fixedly inserted into the fourth through-hole; an insertion portion protruding from one side surface of a center of the coupling and be fitted with an outer diameter of the other end portion of the interconnection member; and a pinhole formed at one side of the insertion portion and connect the insertion portion and the other end portion of the interconnection member by a pin.

In the embodiment, the unlocking block may include: a fifth through-hole formed at a center of the unlocking block so that one end portion of the second pinion gear passes through the fifth through-hole; a serration surface portion formed on an outer peripheral surface of the unlocking block and fixedly inserted into an accommodation space opened at one side of the coupling; and a plurality of first protruding portions formed at a peripheral edge of the unlocking block at predetermined intervals in an axial direction in which the second pinion gear is disposed.

In the embodiment, the brake part may include: a brake ring disposed in an opened accommodation space of the housing; a brake wedge rotatably disposed at a center in the brake ring and having a plurality of second protruding portions provided at a peripheral edge thereof and respectively disposed between the plurality of first protruding portions; a plurality of brake rollers respectively disposed between the brake wedge and the brake ring and between the plurality of first protruding portions and the plurality of second protruding portions; and a plurality of springs respectively disposed between the brake wedge and the brake ring and between the plurality of second protruding portions and the plurality of brake rollers and configured to apply an elastic force to the brake rollers toward the first protruding portions.

In the embodiment, a gear coupling hole may penetrate through a center of the brake wedge so that the second pinion gear is fixedly inserted into the gear coupling hole, and a plurality of second protruding portions may be formed at a peripheral edge of the brake wedge and disposed at predetermined intervals between the plurality of first protruding portions in the axial direction in which the second pinion gear is disposed.

In the embodiment, the plurality of first protruding portions and the plurality of second protruding portions may be formed at intervals of 72 degrees and disposed in a staggered manner.

In the embodiment, a first through-hole may be formed at a center of the housing, one end portion of the coupling may penetrate the housing, a plurality of first coupling protruding portions may integrally protrude from a peripheral edge of the housing and be fixedly fastened to the second fixing member, a plurality of catching protrusions may be disposed between the plurality of first coupling protruding portions with respect to a peripheral edge of the housing, and one side of the cover may be caught by and coupled to the plurality of catching protrusions.

In the embodiment, a second through-hole may be formed at a center of the brake ring, the unlocking block may be disposed in the second through-hole, and a plurality of second coupling protruding portions may be integrally formed at a peripheral edge of the brake ring so as to be respectively accommodated in the plurality of first coupling protruding portions.

In the embodiment, the cover may include: a third through-hole formed at a center of the cover so that a gear shape of the second pinion gear is exposed to the outside; a plurality of third coupling protruding portions integrally protruding from a peripheral edge of the cover so as to be in close contact with the plurality of first coupling protruding portions; and a plurality of catching groove portions disposed between the plurality of third coupling protruding portions with respect to a peripheral edge of the cover so as to be correspondingly and respectively caught by the plurality of catching protrusions.

In the embodiment, the plurality of first coupling protruding portions, the plurality of second coupling protruding portions, and the plurality of third coupling protruding portions may be shaped to correspond to each other at equal intervals of 120 degrees.

In the embodiment, the interconnection member may be provided in the form of a straight pipe.

A vehicle may incorporate the above-described free hinge drive system of the vehicle seat.

A seat for a vehicle may include: a seat cushion on which a passenger is seated; a seatback connected to the seat cushion and configured to support the passenger's back; a headrest provided at an upper end portion of the seatback and configured to support the passenger's neck and head; and a free hinge drive system for a link, where the free hinge drive system may include: a motor mounted at one side of the seat; and a brake device mounted at another side of the seat and configured to stop rotating by a braking force of the brake device under a brake condition and to rotate in a same direction simultaneously by receiving a rotational force of the motor by an interconnection member to eliminate the braking force under a brake release condition, wherein the free hinge drive system is provided in the seat cushion.

According to the free hinge drive system for a link according to the present disclosure, when the motor of one side drive part (inner side) is not operated under the brake condition, the brake may be restrained and regulated in the locked state. When the motor is operated, the rotational force may be transmitted to the brake device of the other side output part (outer side), the locked state of the brake may be released, and the first pinion gear of the motor and the second pinion gear of the brake device may be connected by the interconnection member to rotate the link free hinge part, and the first sector gear gear-coupled to the first pinion gear and the second sector gear gear-coupled to the second pinion gear may have the symmetric shapes. Therefore, it is possible to improve passenger safety by preventing the lift of the second front height link corresponding to the other side output part (outer side) and minimize the forward and rearward movements of the relaxation seat in the event of a rear collision.

In addition, according to the free hinge drive system for a link according to the present disclosure, the interconnection member, which connects the first pinion gear of one side drive part (inner side) adjacent to the motor and the second pinion gear of the other side output part (outer side) adjacent to the brake, may be provided in the form of a straight pipe with high rigidity in the bent shape in the related art. Therefore, it is possible to minimize an influence of rear collision strength according to pipe strength and dimensions, minimize leftward and rightward warping and forward and rearward movements according to pipe mounting positions, and improve mass-production and assembling efficiency by widening an internal space of a relaxation seat.

DESCRIPTION OF SPECIFIC EMBODIMENTS

Figure 1:
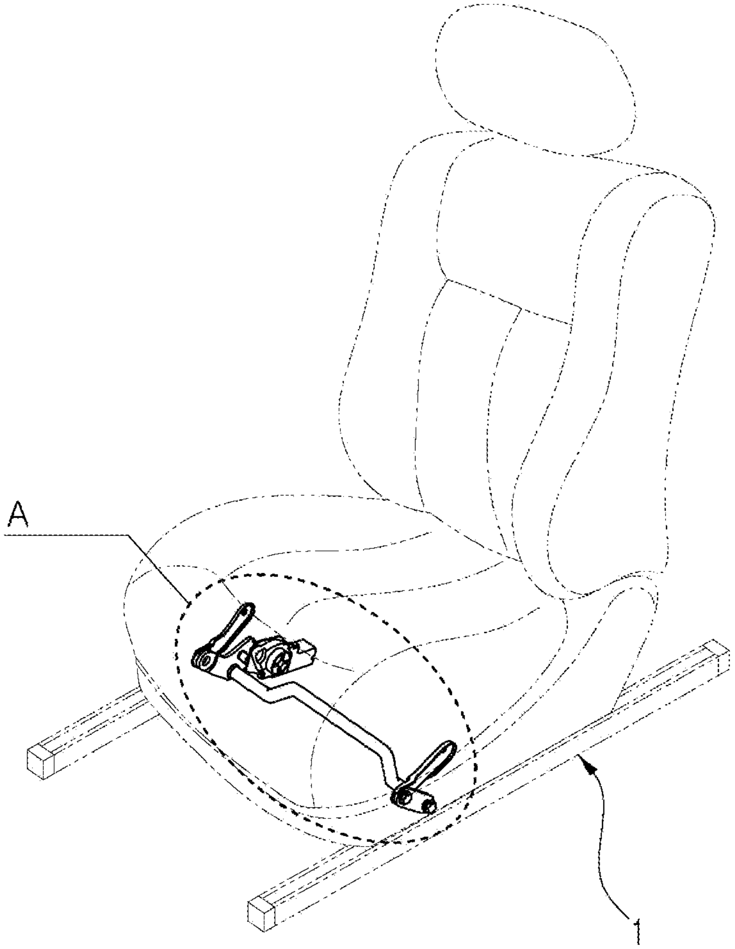
FIG. 1 (Related Art)
FIG. 1 is an exemplary view illustrating a vehicle seat in the related art.
Figure 2:
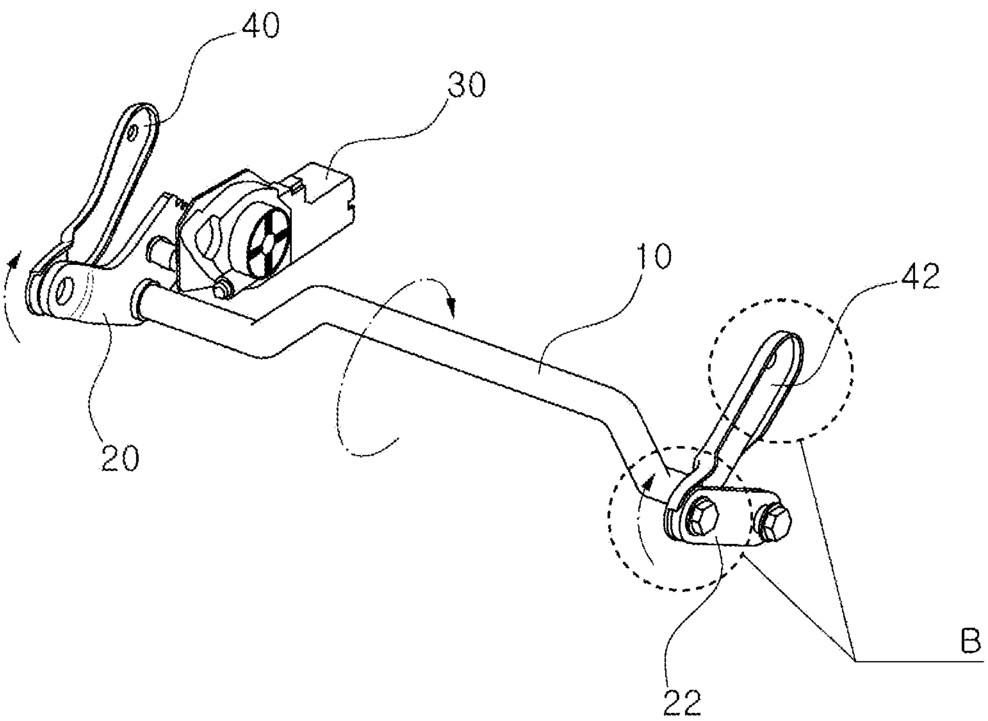
FIG. 2 (Related Art)
FIG. 2 is an exemplary view illustrating part A in FIG. 1 and a structure in which a motor is applied to a single side.
Figure 3:
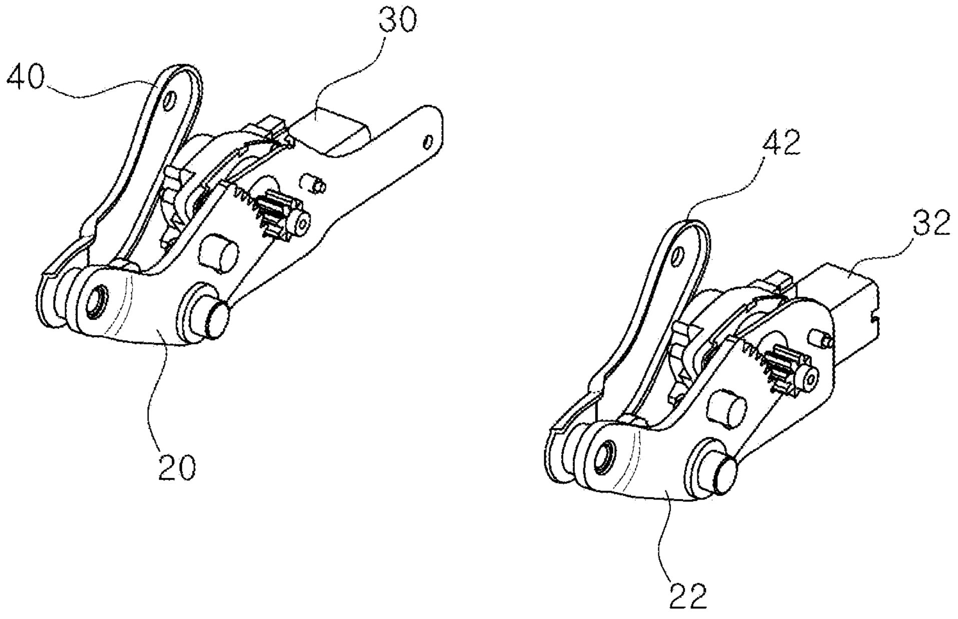
FIG. 3 (Related Art)
FIG. 3 is an exemplary view illustrating a structure in which motors are applied to two opposite sides in the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein.

Hereinafter, exemplary embodiments of the present disclosure will be described with reference to the accompanying drawings, FIGS. 4 to 11, to sufficiently understand the present disclosure. The embodiments of the present disclosure may be modified in various different forms, and it is not interpreted that the scope of the present disclosure is limited to the following embodiments described below in detail. It should be noted that the same components are sometimes denoted by the same reference numerals in each drawing. Descriptions of publicly known related functions or configurations will be omitted when it is determined that the specific descriptions may unnecessarily obscure the subject matter of the present disclosure.

Figure 4:
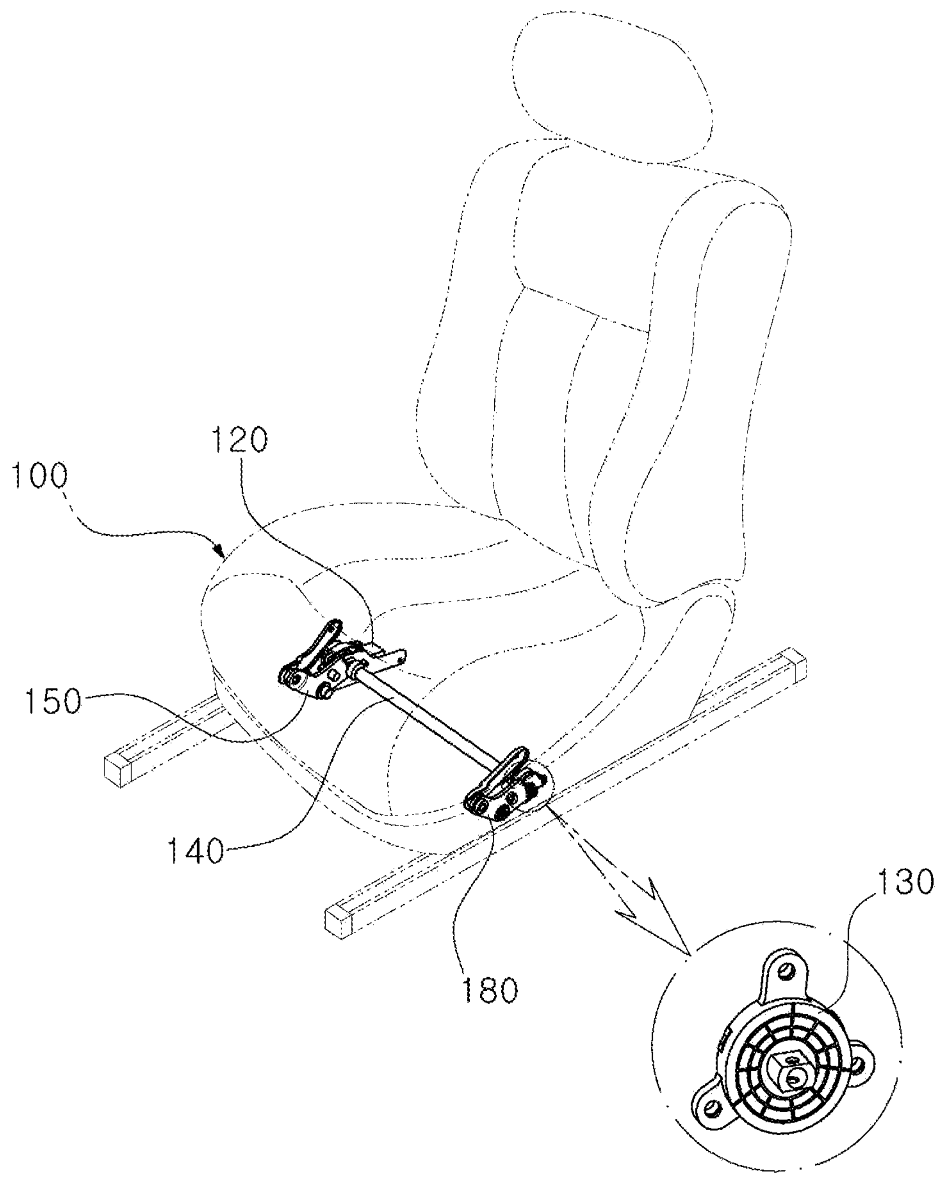
FIG. 4 is an exemplary view illustrating a relaxation seat to which a brake device of the present disclosure is applied.
Figure 5:
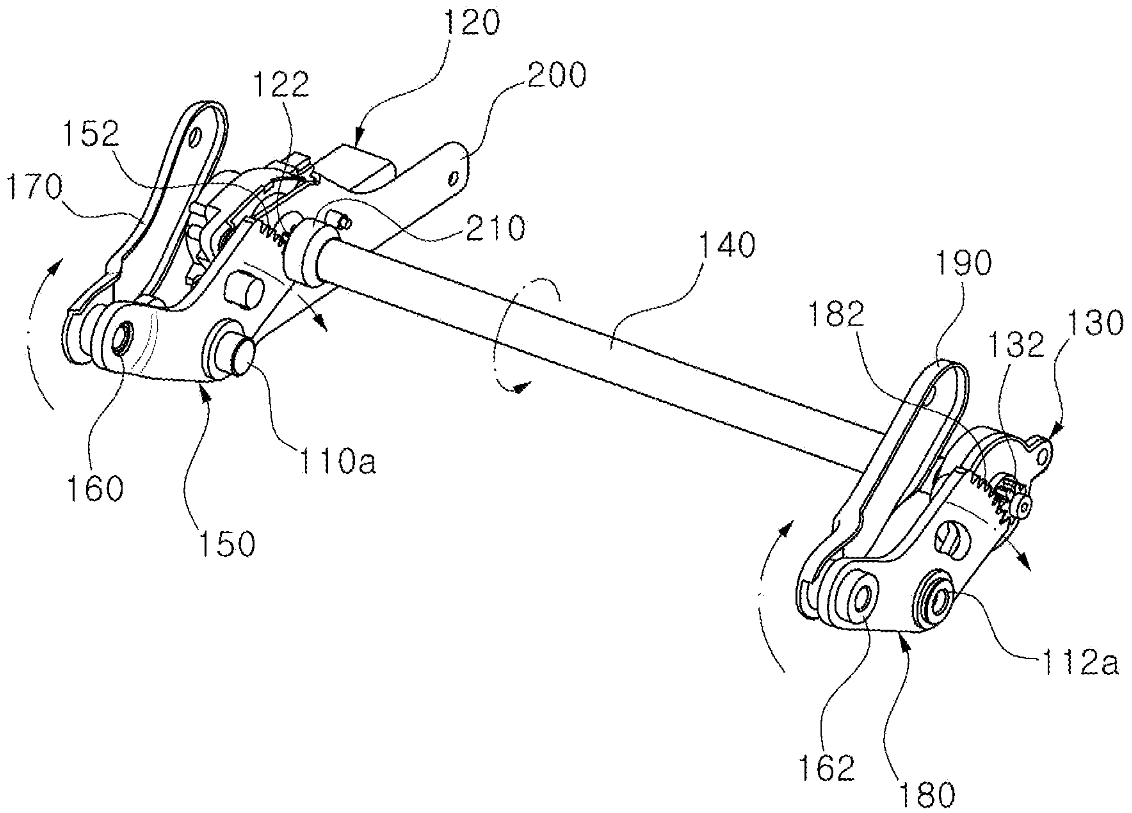
FIG. 5 is an exemplary assembly view illustrating a structure of the present disclosure in which a motor and the brake device are installed with an interconnection pipe interposed therebetween.
Figure 6:
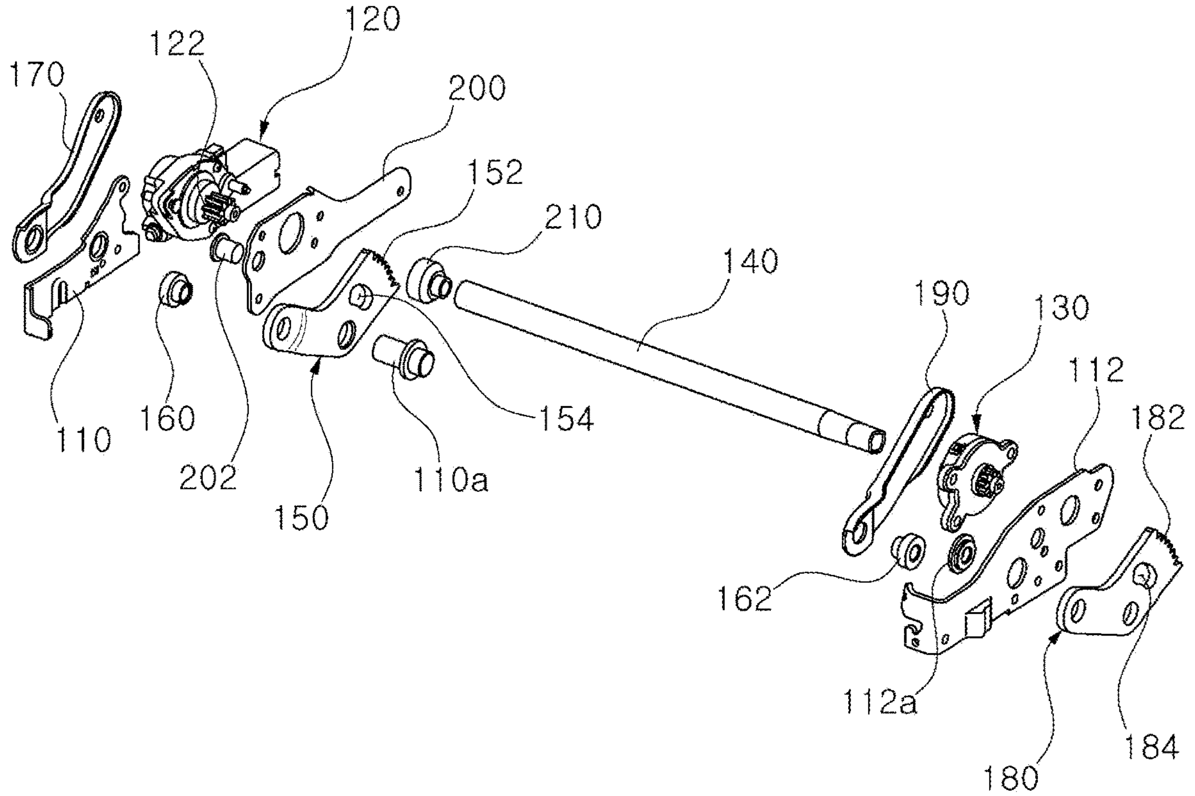
FIG. 6 is an exemplary exploded view illustrating a connection structure between the motor and the brake device of the present disclosure.
Figure 7A:
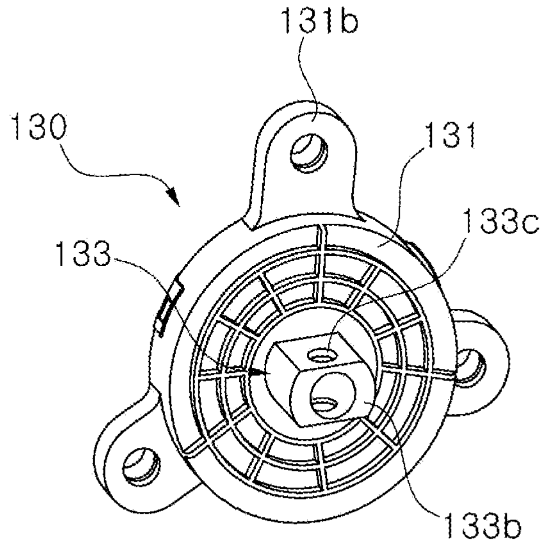
FIG. 7A is a front perspective view illustrating an outer portion of a brake of the present disclosure.
Figure 7B:
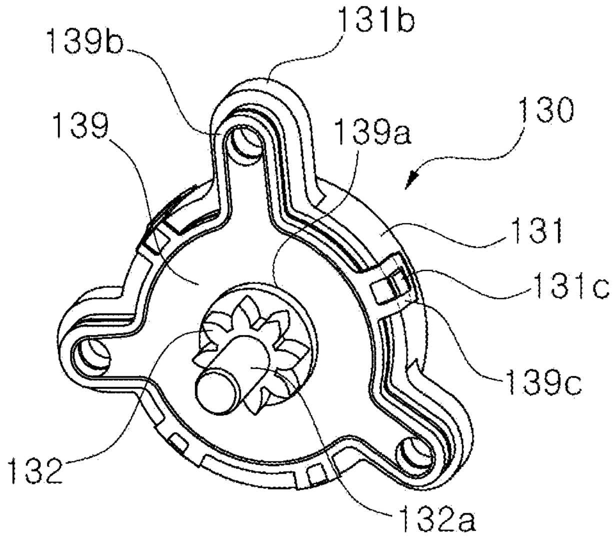
FIG. 7B is a rear perspective view of FIG. 7A.

As illustrated in FIGS. 4 to 6, a free hinge drive system for a link according to an embodiment of the present disclosure may include a first fixing member 110, a second fixing member 112, a motor 120, a first pinion gear 122, a brake 130, a second pinion gear 132, an interconnection member 140, a first sector gear 150, a first front height link 170, a second sector gear 180, a second front height link 190, a motor mounting member 200, and a connection socket 210 that are installed in a vehicle seat (e.g., a relaxation seat 100).

That is, one side of the motor 120 may be mounted at one side of the relaxation seat 100 by the first fixing member 110. The other side of the motor 120 may be mounted at the other side of the relaxation seat 100 by the motor mounting member 200.

In this case, the first pinion gear 122 of the motor 120 may penetrate one side of the motor mounting member 200 and may be connected to one end portion of the interconnection member 140 by the connection socket 210. Because the connection socket 210 is formed in a shape matched with a shape of the first pinion gear 122, it is possible to minimize a free movement and clearance at the time of transmitting torque.

A connection pin 202 may be coupled to a front side of the motor mounting member 200, and an end portion of the connection pin 202 may be inserted into and connected to a first long hole 154 formed at a rear side of the first sector gear 150 so that the first sector gear 150 rotates upward or downward at a predetermined angle about a first rivet 160 as a rotation center.

In addition, the connection socket 210 may penetrate through a center of the motor mounting member 200, one end portion of the connection socket 210 may be fitted with and connected to the first pinion gear 122 while corresponding to a shape of the gear, and the other end portion of the connection socket 210 may be fitted with and connected to an inner diameter of one end portion of the interconnection member 140.

The brake 130 may be mounted on the relaxation seat 100 by the second fixing member 112. The brake operates in a locked state under a braking condition. The locked state of the brake may be released when a rotational force is transmitted to the brake 130 through the interconnection member 140 when the motor 120 operates.

Figure 8:
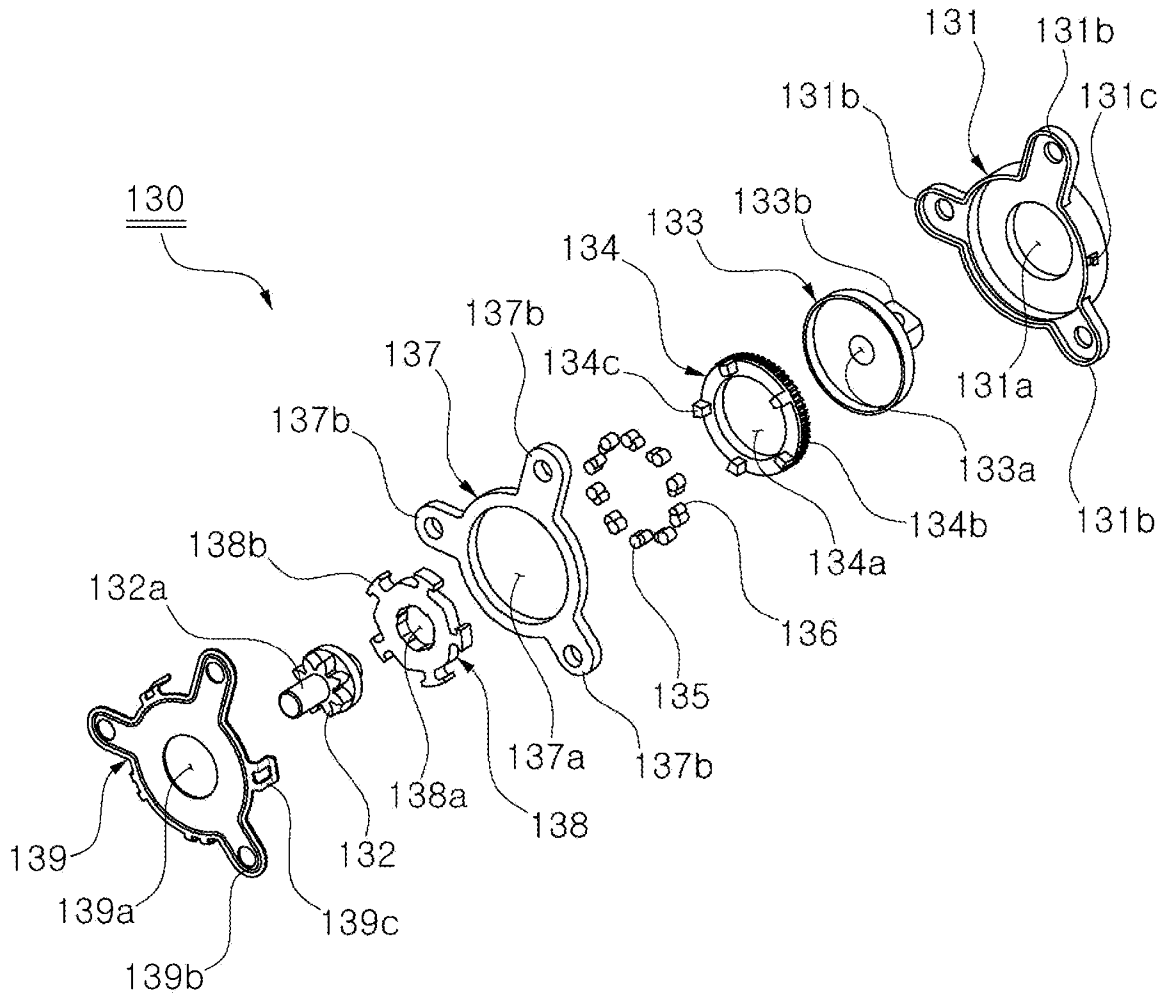
FIG. 8 is an exemplary exploded view illustrating the brake of the present disclosure.
Figure 9:
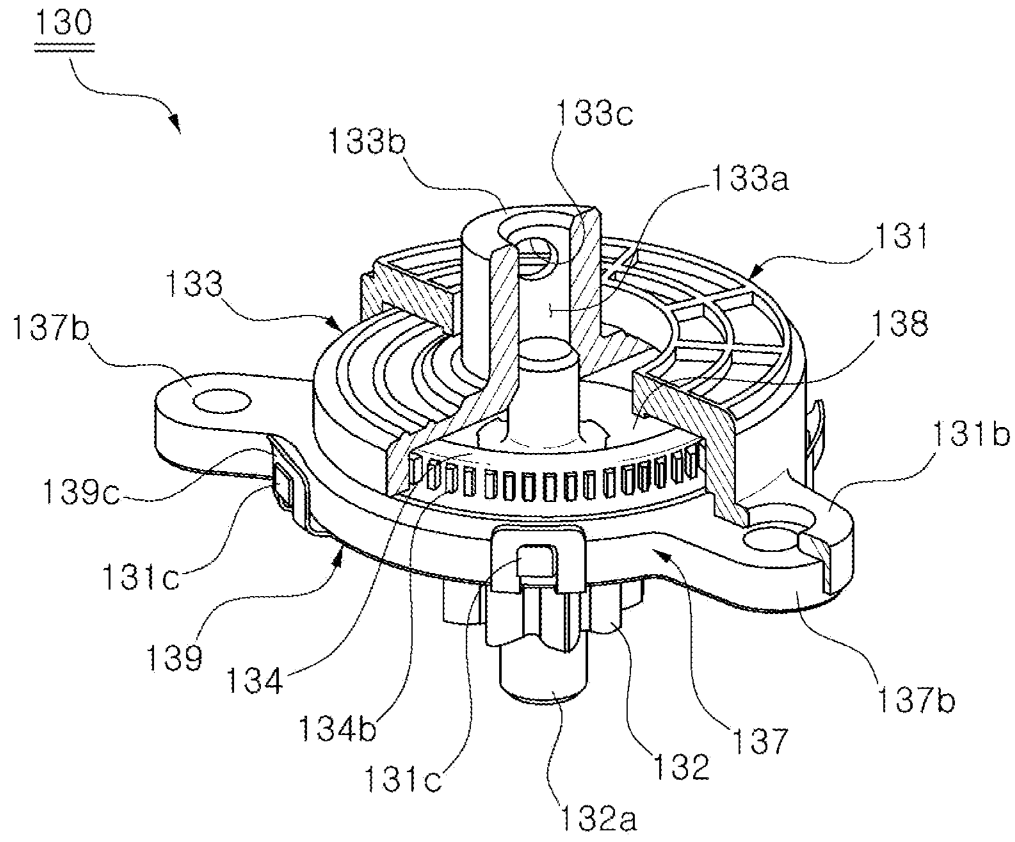
FIG. 9 is an exemplary partial cross-sectional view illustrating the assembled brake of the present disclosure.
Figure 10:
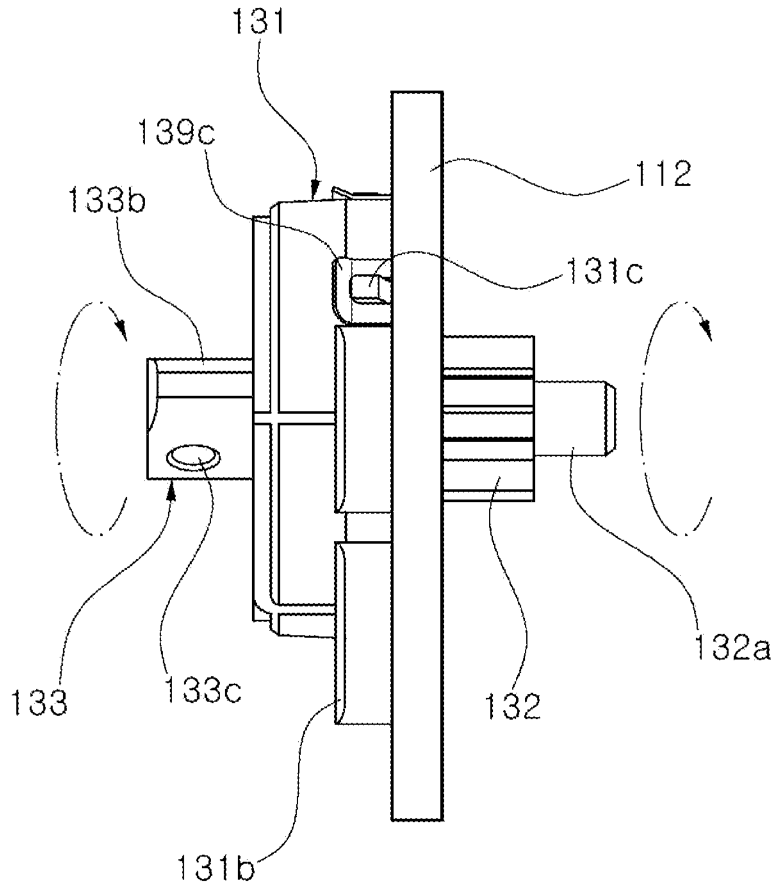
FIG. 10 is an exemplary side view illustrating the assembled brake of the present disclosure.

That is, as illustrated in FIG. 8, the brake 130 includes the second pinion gear 132, a housing 131, a coupling 133, an unlocking block 134, a plurality of rollers 135, a plurality of springs 136, a brake ring 137, a brake wedge 138, and a cover 139.

In this case, the housing 131 may have an accommodation space opened at one side. A first through-hole 131*a* may be formed at a center of the housing 131, and one end portion of the coupling 133 may penetrate the first through-hole 131*a*. A plurality of first coupling protruding portions 131*b* may integrally protrude from a peripheral edge of the housing 131 and may be fixedly fastened to the second fixing member 112. A plurality of catching protrusions 131*c* may be provided between the plurality of first coupling protruding portions 131*b* with respect to the peripheral edge, and one side of the cover 139 may be caught by and coupled to the plurality of catching protrusions 131*c*.

The brake ring 137 may be disposed in the opened accommodation space of the housing 131. A second through-hole 137*a* may be formed at a center of the brake ring 137, and the unlocking block 134 may be disposed in the second through-hole 137*a*. A plurality of second coupling protruding portions 137*b* may be integrally formed at a peripheral edge of the brake ring 137 and respectively accommodated in the plurality of first coupling protruding portions 131*b*.

The coupling 133 may be rotatably disposed between the housing 131 and the brake ring 137, and one end portion of the coupling 133 penetrates the center of the housing 131 and may be connected to the other end portion of the interconnection member 140.

In this case, the coupling 133 may have an accommodation space opened at one side so that the unlocking block 134 is accommodated in the coupling 133. A fourth through-hole 133*a* may be formed at a center of the coupling 133, and one end portion of the second pinion gear 132 may be fixedly inserted into the fourth through-hole 133*a*. An insertion portion 133*b* protrudes from one side surface at the center of the coupling 133 and may be fitted with an outer diameter of the other end portion of the interconnection member 140. A pinhole 133*c* may be formed at one side of the insertion portion 133*b* and connects the insertion portion 133*b* and the other end portion of the interconnection member 140 by a pin.

The unlocking block 134 may be coupled into the coupling 133 and rotates together with the coupling 133. A fifth through-hole 134*a* may be formed at a center of the unlocking block 134, and one end portion of the second pinion gear 132 passes through the fifth through-hole 134*a*. A serration surface portion 134*b* may be formed on an outer peripheral surface of the unlocking block 134 and fixedly inserted into an accommodation space opened at one side of the coupling 133. A plurality of first protruding portions 134*c* may be formed at a peripheral edge of the unlocking block 134 and disposed at predetermined intervals in an axial direction in which the second pinion gear 132 is disposed.

The brake wedge 138 may be rotatably disposed at a center of the brake ring 137. A gear coupling hole 138*a* may penetrate through a center of the brake wedge 138 so that the second pinion gear 132 is fixedly inserted into the gear coupling hole 138*a*. A plurality of second protruding portions 138*b* may be provided at a peripheral edge of the brake wedge 138, disposed between the plurality of first protruding portions 134*c*, and provided at predetermined intervals in the axial direction in which the second pinion gear 132 is disposed.

The second pinion gear 132 may be coupled to the gear coupling hole 138*a* at the center of the brake wedge 138 and may rotate together with the brake wedge 138. A gear shaft 132*a* may integrally protrude in a forward/rearward direction from a rotation center of the second pinion gear 132 so that the gear shaft 132*a* penetrates the center of the unlocking block 134 and is fixedly inserted into the fourth through-hole 133*a* of the coupling 133, such that the gear shaft 132*a* rotates together with the coupling 133.

The plurality of brake rollers 135 may be respectively disposed between the brake wedge 138 and the brake ring 137 and between the plurality of first protruding portions 134*c* and the plurality of second protruding portions 138*b*.

The plurality of springs 136 may be respectively disposed between the brake wedge 138 and the brake ring 137 and between the plurality of second protruding portions 138*b* and the plurality of brake rollers 135 and serves to apply an elastic force to the brake rollers 135 and the first protruding portions 134*c*.

Figure 11:
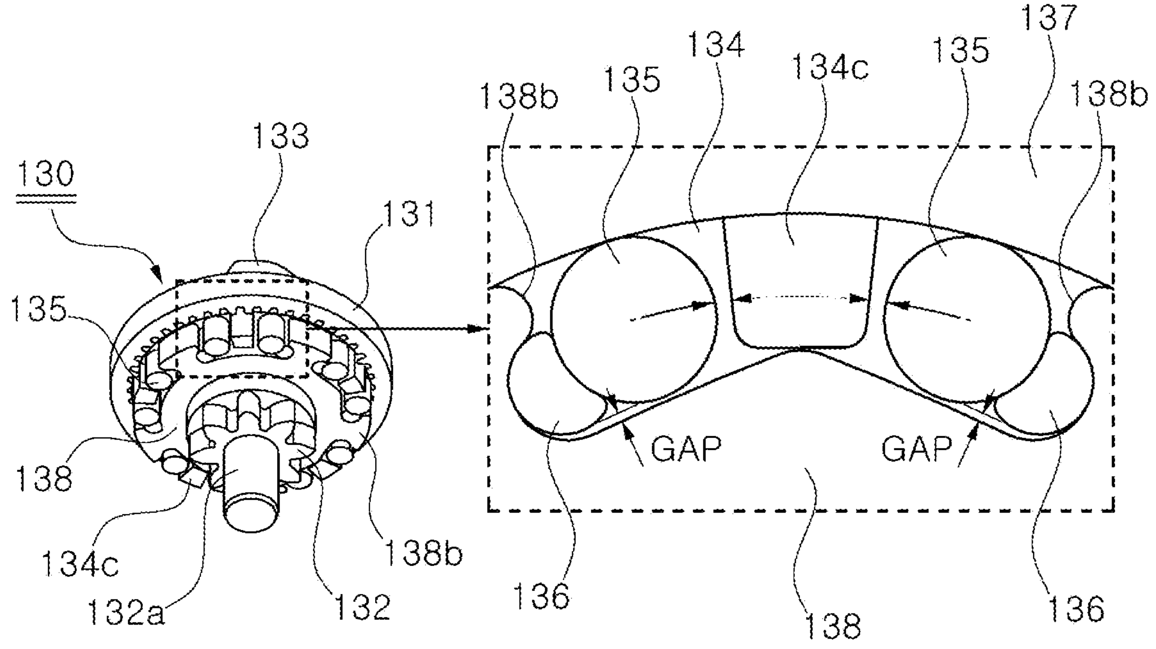
FIG. 11 is an exemplary view for explaining an operation of the brake the present disclosure.

That is, under the brake condition as illustrated in FIG. 11, the plurality of brake rollers 135 and the plurality of springs 136 come into a brake locked state in which a braking force is generated as the brake rollers 135 are fitted in a wedge shape between the brake wedge 138 and the brake ring 137 by the springs 136.

However, when the unlocking block 134 is rotated by receiving a rotational force of the coupling 133 connected to the interconnection member 140, the brake roller 135 in the rotation direction may be pushed, the brake roller 135 in the opposite direction may be released from the wedge state at the moment, and the brake wedge 138 may be rotated, such that an unlocked state of the brake is made in which a braking force is eliminated so that the second pinion gear 132 connected to the brake wedge 138 rotates together with the brake wedge 138.

In this case, the first pinion gear 122 of one side drive part (inner side) adjacent to the motor 120 and the second pinion gear 132 of the other side output part (outer side) adjacent to the brake 130 are rotated in the same direction, such that the first sector gear 150, which corresponds to one side drive part (inner side), a link free hinge part, which is a coupled body of the first front height link 170, the second sector gear 180, which corresponds to the other side output part (outer side), and a link free hinge part, which is a coupled body of the second front height link 190, are simultaneously operated in the same direction and at the same speed by the operation of the single motor 120.

The cover 139 may be coupled to the housing 131 while covering the opened accommodation space of the housing 131 so that the other end portion of the second pinion gear 122 protrudes to the outside. A third through-hole 139*a* may be formed at a center of the cover 139 so that the gear shape of the second pinion gear 132 is exposed to the outside. A plurality of third coupling protruding portions 139*b* may be integrally formed with the cover 139 to protrude from a peripheral edge of the cover 139 so as to be in close contact with the plurality of first coupling protruding portions 131*b*. A plurality of catching groove portions 139*c* may be disposed between the plurality of third coupling protruding portions 139*b* with respect to the peripheral edge of the cover 139 so that the plurality of catching groove portions 139*c* is correspondingly and respectively caught by the plurality of catching protrusions 131*c*.

In this case, the plurality of first coupling protruding portions 131*b*, the plurality of second coupling protruding portions 137*b*, and the plurality of third coupling protruding portions 139*b* may be formed to correspond in shape to each other at the same interval of 120 degrees.

The plurality of first protruding portions 134*c* and the plurality of second protruding portions 138*b* may be formed at intervals of 72 degrees and disposed to face each other in a staggered manner.

The interconnection member 140 may connect the first pinion gear 122 and the second pinion gear 132 so that when the motor 120 operates, the rotational force may be transmitted to the brake 130, and the brake-locked state of the brake 130 may be released. When the motor 120 of one side drive part (inner side) operates, the interconnection member 140 transmits the rotational force of the first pinion gear 122 to the unlocking block 134 by the coupling 133 of the brake 130 of the other side output part (outer side) so that the unlocking block 134 rotates at the same rate. Therefore, the first sector gear 150, which corresponds to one side drive part (inner side), the link free hinge part, which is the coupled body of the first front height link 170, the second sector gear 180, which corresponds to the other side output part (outer side), and the link free hinge part, which is the coupled body of the second front height link 190, are simultaneously operated by the operation of the single motor 120.

In this case, as illustrated in FIG. 5, the interconnection member 140 may be provided in the form of a high-rigidity straight pipe having no bent portion. Because the interconnection member 140 is structured to connect one side drive part (inner side), which is mounted with the motor 120, and the other side output part (outer side) mounted with the brake 130, it is possible to not only minimize an influence of rear collision strength according to pipe strength and dimensions but also minimize leftward/rightward warping and forward and rearward movements according to pipe mounting positions. Therefore, a situation in the related art in which an internal space of a seat is narrowed by a bent portion may be eliminated, thereby improving mass-production assembling properties.

The first sector gear 150 may be structured to have a first rack 152 so that a central side of the first sector gear 150 is rotatably connected to one side of the first fixing member 110 by a first hinge 110*a*, and a rear side of the first sector gear 150 may be gear-coupled to the first pinion gear 122.

The first front height link 170 may be structured to be rotatably connected to the front side of the first sector gear 150 by the first rivet 160.

The second sector gear 180 may be structured to have a second rack 182 so that a central side of the second sector gear 180 is rotatably connected to one side of the second fixing member 112 by a second hinge 112*a*, and a rear side of the second sector gear 180 may be gear-coupled to the second pinion gear 132.

The second front height link 190 may be structured to be rotatably connected to the front side of the second sector gear 180 by a second rivet 162.

In this case, the first sector gear 150 and the second sector gear 180 have symmetric shapes. A distance from the first rack 152 of the first sector gear 150 to an installation point of the first hinge 110*a* may be equal to a distance from the second rack 182 of the second sector gear 180 to an installation point of the second hinge 112*a*.

That is, in case that the first sector gear 150 and the second sector gear 180 have the symmetric shapes, torque applied by a load of the relaxation seat 100 may be distributed to two opposite sides without being concentrated at one side. Therefore, it is possible to prevent impact load torque from being biased to one side in the event of a rear collision and prevent the cushion from being separated in the event of a rear collision. The application of the first and second sector gears 150 and 180 having the same specifications and the positions of the first and second hinges 110*a* and 112*a* may prevent the forward and rearward movements of the relaxation seat 100 and prevent the occurrence of abnormal noise.

As described above, according to the free hinge drive system for a link according to the present disclosure, when the motor 120 of one side drive part (inner side) does not operate under the brake condition, the brake may be restrained and regulated in the locked state. When the motor 120 operates, the rotational force may be transmitted to the brake 130 of the other side output part (outer side), the locked state of the brake may be released, and the first pinion gear 122 of the motor 120 and the second pinion gear 132 of the brake 130 are connected by the interconnection member 140 to rotate the link free hinge part B, and the first sector gear 150 gear-coupled to the first pinion gear 122 and the second sector gear 180 gear-coupled to the second pinion gear 132 have the symmetric shapes. Therefore, it is possible to improve passenger safety by preventing the lift of the second front height link 170 corresponding to the other side output part (outer side) and minimize the forward and rearward movements of the relaxation seat 100 in the event of a rear collision.

In addition, according to the free hinge drive system for a link according to the present disclosure, the interconnection member 140, which connects the first pinion gear 122 of one side drive part (inner side) adjacent to the motor 120 and the second pinion gear 132 of the other side output part (outer side) adjacent to the brake 130, may be provided in the form of a high-rigidity straight pipe in the bent shape in the related art. Therefore, it is possible to minimize an influence of rear collision strength according to pipe strength and dimensions, minimize leftward/rightward warping and forward and rearward movements according to pipe mounting positions, and improve mass-production assembling properties by widening an internal space of a vehicle seat (e.g., a relaxation seat).

Meanwhile, the present disclosure is not limited only to the above-mentioned embodiments, but may be modified, altered, and carried out without departing from the subject matter of the present disclosure, and the technical spirit with such modifications and alterations should be considered as falling within the scope of the appended claims.

What is claimed is:

1. A free hinge drive system for a link of a vehicle seat, the free hinge drive system comprising:

a motor mounted at one side of the vehicle seat;

a brake device mounted at another side of the vehicle seat and configured to stop rotating by a braking force of the brake device under a brake condition and to rotate in a same direction simultaneously by receiving a rotational force of the motor by an interconnection member to eliminate the braking force under a brake release condition;

a first sector gear having a central side rotatably connected to one side of a first fixing member, and a rear side gear-coupled to a first pinion gear of the motor; and a first front height link rotatably connected to a front side of the first sector gear, wherein one side portion of the motor is mounted on a motor mounting member installed at one side of the vehicle seat so that the first pinion gear penetrates through one end portion of the interconnection member, and wherein a connection socket penetrates through a center of the motor mounting member, one end portion of the connection socket is fitted with and connected to the first pinion gear while corresponding to a gear shape.

2. The free hinge drive system of claim 1, wherein the motor is mounted on the vehicle seat by the first fixing member.

3. The free hinge drive system of claim 1, wherein another end portion of the connection socket is fitted with and connected to an inner diameter of one end portion of the interconnection member.

4. The free hinge drive system of claim 1, wherein the brake device is mounted on the vehicle seat by a second fixing member, the free hinge drive system further comprising:

a second sector gear having a central side rotatably connected to one side of the second fixing member and a rear side gear-coupled to a second pinion gear of the brake device; and a second front height link rotatably connected to a front side of the second sector gear.

5. The free hinge drive system of claim 4, wherein the brake device comprises:

a coupling connected to the interconnection member;

an unlocking block connected to be accommodated in the coupling; and a brake configured to perform control to stop a rotation of the unlocking block under the brake condition and to rotate the unlocking block and the second pinion gear under the brake release condition.

6. The free hinge drive system of claim 5, wherein the second pinion gear, the coupling, the unlocking block, and the brake are rotatably supported between a housing and a cover coupled to correspond to each other.

7. The free hinge drive system of claim 6, wherein the coupling comprises:

a fourth through-hole formed at a center of the coupling;

a gear shaft of the second pinion gear is fixedly inserted into the fourth through-hole;

an insertion portion protrudes from one side surface of a center of the coupling and is fitted with an outer diameter of the other end portion of the interconnection member; and a pinhole is formed at one side of the insertion portion and connects the insertion portion and the other end portion of the interconnection member by a pin.

8. The free hinge drive system of claim 6, wherein the unlocking block comprises:

a fifth through-hole formed at a center of the unlocking block so that one end portion of the second pinion gear passes through the fifth through-hole;

a serration surface portion is formed on an outer peripheral surface of the unlocking block and fixedly inserted into an accommodation space opened at one side of the coupling; and a plurality of first protruding portions is formed at a peripheral edge of the unlocking block at predetermined intervals in an axial direction in which the second pinion gear is disposed.

9. The free hinge drive system of claim 8, wherein the brake comprises:

a brake ring disposed in an opened accommodation space of the housing;

a brake wedge rotatably disposed at a center in the brake ring and having a plurality of second protruding portions provided at a peripheral edge thereof and respectively disposed between the plurality of first protruding portions;

a plurality of brake rollers respectively disposed between the brake wedge and the brake ring and between the plurality of first protruding portions and the plurality of second protruding portions; and a plurality of springs respectively disposed between the brake wedge and the brake ring and between the plurality of second protruding portions and the plurality of brake rollers and configured to apply an elastic force to the brake rollers toward the first protruding portions.

10. The free hinge drive system of claim 9, wherein a gear coupling hole penetrates through a center of the brake wedge so that the second pinion gear is fixedly inserted into the gear coupling hole, and the plurality of second protruding portions is formed at a peripheral edge of the brake wedge and disposed at predetermined intervals between the plurality of first protruding portions in the axial direction in which the second pinion gear is disposed.

11. The free hinge drive system of claim 10, wherein the plurality of first protruding portions and the plurality of second protruding portions are formed at intervals of 72 degrees and disposed in a staggered manner.

12. The free hinge drive system of claim 9, wherein the housing comprises: a first through-hole formed at a center of the housing in which one end portion of the coupling penetrates the housing; a plurality of first coupling protruding portions integrally protruding from a peripheral edge of the housing and is fixedly fastened to the second fixing member and a plurality of catching protrusions disposed between the plurality of first coupling protruding portions with respect to a peripheral edge of the housing in which one side of the cover is caught by and coupled to the plurality of catching protrusions.

13. The free hinge drive system of claim 12, wherein a second through-hole is formed at a center of the brake ring, the unlocking block is disposed in the second through-hole, and a plurality of second coupling protruding portions is integrally formed at a peripheral edge of the brake ring so as to be respectively accommodated in the plurality of first coupling protruding portions.

14. The free hinge drive system of claim 13, wherein the cover comprises: a third through-hole formed at a center of the cover so that a gear shape of the second pinion gear is exposed to the outside; a plurality of third coupling protruding portions integrally protruding from a peripheral edge of the cover so as to be in close contact with the plurality of first coupling protruding portions; and a plurality of catching groove portions disposed between the plurality of third coupling protruding portions with respect to a peripheral edge of the cover so as to be correspondingly and respectively caught by the plurality of catching protrusions.

15. The free hinge drive system of claim 14, wherein the plurality of first coupling protruding portions, the plurality of second coupling protruding portions, and the plurality of third coupling protruding portions are shaped to correspond to each other at equal intervals of 120 degrees.

16. The free hinge drive system of claim 1, wherein the interconnection member is provided in the form of a straight pipe.

17. The free hinge drive system of claim 4, wherein a distance from a first rack of the first sector gear to an installation point of a first hinge is equal to a distance from a second rack of the second sector gear to an installation point of a second hinge.

18. A vehicle comprising the free hinge drive system of the vehicle seat of claim 1.

19. A seat for a vehicle, the seat comprising:

a seat cushion on which a passenger is seated;

a seatback connected to the seat cushion and configured to support the passenger's back;

a headrest provided at an upper end portion of the seatback and configured to support the passenger's neck and head; and a free hinge drive system for a link, the free hinge drive system comprising:

a motor mounted at one side of the seat;

a brake device mounted at another side of the seat and configured to stop rotating by a braking force of the brake device under a brake condition and to rotate in a same direction simultaneously by receiving a rotational force of the motor by an interconnection member to eliminate the braking force under a brake release condition, wherein the free hinge drive system is provided in the seat cushion;

a first sector gear having a central side rotatably connected to one side of a first fixing member, and a rear side gear-coupled to a first pinion gear of the motor; and a first front height link rotatably connected to a front side of the first sector gear, wherein one side portion of the motor is mounted on a motor mounting member installed at one side of the vehicle seat so that the first pinion gear penetrates through one end portion of the interconnection member, and wherein a connection socket penetrates through a center of the motor mounting member, one end portion of the connection socket is fitted with and connected to the first pinion gear while corresponding to a gear shape.

* * * * *